United States Patent
Mestais et al.

(10) Patent No.: US 6,329,651 B1
(45) Date of Patent: Dec. 11, 2001

(54) PROCESS AND DEVICE FOR REAL TIME SORTING OF DETECTION EVENTS FROM A GAMMA RAY DETECTOR AND CORRECTION OF THE UNIFORMITY OF DETECTION ELEMENTS FROM THE DETECTOR

(75) Inventors: Corinne Mestais, La Terrasse; Alain Chapuis, Le Vinoux; Franåoise Mathy, Meylan; Loïck Verger, Grenoble, all of (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 09/516,807

(22) Filed: Mar. 1, 2000

(30) Foreign Application Priority Data

Mar. 5, 1999 (FR) .................................. 99 02774

(51) Int. Cl.$^7$ .................................................. G01D 18/00
(52) U.S. Cl. .............................. 250/252.1; 250/370.01; 250/366; 324/102
(58) Field of Search .................. 250/370.01, 370.09, 250/252.1, 366; 324/102

(56) References Cited

U.S. PATENT DOCUMENTS

| 4,400,621 | 8/1983 | Kiefer et al. ...................... 250/385 |
| 5,821,538 | * 10/1998 | De Antoni et al. ............. 250/370.01 |
| 5,854,489 | 12/1998 | Verger et al. .................... 250/370.06 |

FOREIGN PATENT DOCUMENTS

| 0 763 751 | 3/1987 | (EP) | ............................... G01T/1/24 |
| 2 214 390 | 8/1989 | (GB) | ............................. G01T/1/208 |

* cited by examiner

Primary Examiner—Robert H. Kim
(74) Attorney, Agent, or Firm—Hayes, Soloway, Hennessey, Grossman & Hage, P.C.

(57) ABSTRACT

Process for real time sorting of signals from several semiconductor detection elements in which:
  a) during a calibration phase:
    amplitude data and signal rise time data are established for each event signal,
    a biparametric detection spectrum with amplitude and rise time data is acquired,
    a biparametric acceptance window corresponding respectively to an amplitude-rise time correlation is established, and
  b) during an examination phase:
    an amplitude, rise time data pair is established in real time for each event signal detected,
    the events are sorted in real time, selecting the signals according to whether their amplitude and rise time data are or are not within the window.

20 Claims, 2 Drawing Sheets

0
PROCESS AND DEVICE FOR REAL TIME SORTING OF DETECTION EVENTS FROM A GAMMA RAY DETECTOR AND CORRECTION OF THE UNIFORMITY OF DETECTION ELEMENTS FROM THE DETECTOR

FIELD OF THE INVENTION

This invention involves a process for real time sorting of detection signals from a ☐ radiation detector allowing for distinguishing between signals corresponding to direct radiation and signals corresponding to indirect or diffused radiation.

Direct radiation means radiation which, after having been emitted from a radioactive zone, interacts directly with the detector. Indirect radiation on the other hand interacts one or several times with a medium surrounding the radioactive zone before interacting with the detector.

The invention also concerns a device and particularly a gamma-camera which uses the sorting process.

The invention also involves a process for correcting the detection uniformity for several detection elements of the detector.

The invention is applied in particular in the field of medical imaging and in medicine for the gamma-camera.

STATE OF THE PRIOR ART

In nuclear medicine and according to certain diagnostic methods, a patient is injected with radioisotopes in the form of molecules marked with a radioactive tracer such as, for example, Technetium, Iodine or Thallium. The molecules, depending on the type used, attach selectively to certain tissues or organs.

A gamma-camera is then used to detect gamma rays emitted from the patient and to make an image of the tissues or organ in question. The image contrast depends on the binding of the radioisotopes by the tissues.

The gamma-cameras used are mostly Anger type cameras. Such a camera is shown schematically in FIG. 1.

The gamma-camera includes essentially a crystal scintillator 10, equipped with a collimator 12, and several photomultipliers 14 optically paired with the crystal scintillator by a transparent material 16.

A barycentric calculation done on the signal emitted by each photomultiplier in response to an event allows for localisation of the place of the crystal scintillator where the gamma ray interacted with the material.

This localisation also allows for identification of the position of a radioactive zone 18 from which the radiation was emitted. This is possible due in particular to the collimator 12 which, as is shown in FIG. 1, allows for elimination of rays of which the incidence is not normal with respect to the entry side of the detector.

The gamma rays which reach the crystal scintillator can, like the ray 20 in FIG. 1, be rays which, after having left the radioactive zone 18, interact directly with the detector. These rays are part of a phenomenon referred to in the remainder of the text as "direct radiation".

Other rays however interact once or several times with the material surrounding the radioactive zone before reaching the scintillator. This is the case for ray 21 for example in the figure, which interacts once in the patient outside of the radioactive zone. After this first interaction, a diffused gamma ray of lower energy reaches the scintillator. This phenomenon, due to the Compton effect, is referred to as "diffused radiation" in the remainder of the text.

It can be seen on the figure that the diffused radiation can result in erroneous localisation of the radioactive zone and can contribute to degradation of the contrast of the medical image by addition of noise.

As mentioned above, diffused radiation is characterised by the fact that its energy is lower than that of direct radiation.

By distinguishing the detection signals, i.e. by rejecting those for which the amplitude as a function of energy is below a determined threshold or for which the amplitude as a function of energy is outside of a defined window, the contribution from diffused radiation can be eliminated.

In general, an amplitude window is set around the maximum amplitude value as a function of the energy of the signals for a given energy emission from the radioactive zone.

If the window is narrow, the contrast of the image is increased by limiting the acceptance of diffused radiation. This occurs to the detriment of the number of effective events detected however, i.e. the number of events which can be used to form an image.

Inversely, if the window is wider, the number of events is greater for a given measurement time, but the image contrast is poorer.

In the case of medical imaging applications, it is not possible to inject patients with highly radioactive doses nor is it comfortable for the examination to last a long time. The number of effective events measured per unit time and the energy resolution of the detector are thus important parameters.

The energy resolution is understood to be the ratio of the width at half-height of a distribution of the energy peak around the emission energy value to the emission energy.

A recent development of gamma-cameras, in which t he scintillator detectors are replaced by semi-conductor detectors, allowed for improved acquisition of events in terms of efficiency and energy resolution.

Semi-conductor detectors such as CdTe, CdZnTe, AsGa, $PbI_2$ directly convert gamma photons into charge bearers. For radiation of the same intensity, the number of charges created is of an order of magnitude greater than that obtained by indirect detection with scintillator detectors. The resolution of the semiconductor detectors is thus also improved.

FIG. 2 shows the structure of a semi-conductor detector. It includes a platform 30 equipped with integrated electronic circuits 32 on which several detection elements 34 are mounted.

These detection elements 34 are each in the form of a semi-conductor block with two parallel opposite sides on which electrodes are to be placed. An electric field applied to the electrodes allows for migration of the charge bearers, i.e. the electrons and the holes formed by interaction of the radiation with the semi-conductor. The electrodes, not shown on the figure, will also receive charges and transfer them to the integrated circuits of platform 30 for formation of a detection signal.

Not all of the charges created in the semi-conductor migrate directly to the electrodes. Flaws in the semi-conductors trap some charge bearers during their migration and reduce their life span, this effect increasing as the semi-conductor becomes thicker.

The charge created by gamma radiation is divided between a charge borne by the electrons and a charge borne by the holes. The mobility of the holes is lower than that of the electrodes and their collection efficiency is not as good. Thus the charges created do not all contribute equally to the detection signal which is finally delivered.

In the energy spectrum of the detection signal, this results in a "drag" corresponding to energy which is weaker than the energy of the photons which reach the detection element material.

The "drag" is characteristic of the trapping of the charges in the material before their collection.

The events detected, the energy of which is less than the energy of the gamma photons received due to the trapping phenomenon, are therefore not distinguishable from those which result from the diffused radiation mentioned previously, for which the energy is also less than that of the direct radiation.

For the semi-conductor detectors, the establishment of an acceptance amplitude window for the signals eliminates not just the events corresponding to diffused radiation, but also the events affected by the trapping of charges which is however direct radiation.

The difficulties in charge collection and the influences on the detection signal are described in patent FR-2 738 919. This patent proposes a process and an operating device with a signal supplied by a detector which overcomes the poor transport properties of the holes in the detection element material. The purpose of the process described is to make an electronic correction after acquisition of a biparametric spectrum of the contribution of the events for which all of the charge deposited in the detector could not be collected and of which the signals have a total amplitude which is less than the expected amplitude.

The practical application of this method in a gamma-camera for medical use involves acquiring during the examination a biparametric spectrum with good statistics for each pixel. Due to reasons related to the dose and the acquisition time however, this is not possible for clinical examinations. The correction processing requires a great deal of memory and would require prior calculation by the software of the correction to be applied. Such processing is therefore slow and must be done as any times as there are pixels in the detector. Since the processing is done after the acquisition, it is impossible to display the image of the events accepted in real time.

This is a serious handicap for medical diagnosis.

Another difficulty with semi-conductor detectors is that the efficiency of the detection and the collection of charges is not the same for all of the detection elements.

The collection of charges depends on the structure and the crystalline quality of the detection elements. It also depends on the electrical field applied to the electrodes and possible flaws in the material which could trap the charges.

In the same way, small variations in the area or thickness of the detection elements can also affect their detection effectiveness.

These phenomena produce images which are not uniform and which do not allow for precise medical diagnosis.

It would theoretically be possible to establish a fixed correction multiplier coefficient for each detection element, adjusted to obtain uniform detection efficiency.

This approach is not satisfactory however because it leads to artificially taking into account non-existent events for the least efficient detection elements (correction coefficient greater than 1), and to eliminate without discernment some events for the most efficient detection elements (correction coefficient less than 1).

SUMMARY OF THE INVENTION

This invention proposes a process and device for sorting events for a semi-conductor detector which distinguishes signals of events resulting from diffused radiation and signals of events resulting from a collection of incomplete charges.

Another goal is to propose a process for correction of the detection uniformity of the various detection elements of a detector.

Another goal is to propose such a correction process which would selectively and preferentially retain the events resulting from direct radiation.

Lastly, another goal of the invention is to propose a process for processing which could be used in real time and continuously in order to allow for the formation of an image instantaneously and to thus facilitate medical diagnosis.

To achieve these goals, the invention more precisely concerns a process for sorting in real time of detection event signals from a detector of gamma radiation ($\square$) including at least one semi-conductor detection element. In this process:

a) during a calibration phase
   for each event signal, amplitude data and signal rise time data are established,
   a biparametric detection spectrum with amplitude and rise time data is acquired for a set including at least one detection element,
   a biparametric acceptance window corresponding respectively to an amplitude-rise time correlation characteristic of at least one radiation energy is established, and b) during an examination phase
   an amplitude, rise time data pair is established in real time for each event signal detected from each set of detection elements,
   the events are sorted in real time, selecting the signals according to whether their amplitude and rise time data are or are not within the biparametric window of the corresponding set of detection elements, and rejecting the signals of which the amplitude and rise time data are outside the aforesaid biparametric window.

Biparametric window means a window bounded by two characteristic event parameters. In this case these are the amplitude and the rise time of the signals corresponding to the events detected.

The invention is based on the physical principle by which the signals of events resulting from direct radiation but corresponding to the drag of the energy spectrum mentioned in the introduction show a correlation between their amplitude and rise time which is different from that obtained for events resulting from diffused radiation.

The first phase of the process, i.e. the calibration phase, can be done in the absence of a patient to be examined.

A radiation source corresponding to the radioactive material injected into the patient is placed facing a detector. The activity of this source and the exposure time may be greater than those chosen for examining a patient. Thus during the calibration phase, a spectrum for a large number of events may be acquired.

A source which produces an essentially uniform flow is preferably used.

The calibration phase can be simultaneous for all the detection elements or for only some of the elements.

To reduce the size of the acquisition memory during the calibration phase, several sets of detection elements, each containing one or several elements, may be processed successively.

The process can be applied with a single energy source or a source for which the emission spectrum shows several main peaks with different energies.

In this latter case, a biparametric window can be established for each of the radiation energies.

A biparametric window can be exhaustively established for each main emission energy of the source and for each of the detection elements of the detector.

In particular, for each detection element or each set of elements, the calibration phase can involve successive steps during which:

a continuous set of rise time sections is defined, each event detected is assigned to a rise time section as a function of its rise time data, for each rise time section, an amplitude spectrum is established with the amplitude data of the events of which the rise time is within the aforesaid rise time section, an amplitude spectrum maximum is determined for each rise time section, for each rise time section, an amplitude interval is determined on both sides of the aforesaid maximum.

The number of rise time sections and the rise time interval corresponding to each section may be adjusted as a function of the fineness of resolution sought. The time interval may be on the order of 50 ns for example.

A continuous set of rise time sections means a set of successive sections such that the upper bound of the rise time for one section corresponds to the lower bound of the next section.

The amplitude spectrum is the recording, for each amplitude or for a continuous set of amplitude intervals, of the number of events for which the signal has such an amplitude.

Smoothing of the aforesaid spectrum is preferably done before determining the maximum for each amplitude spectrum. This smoothing can be done by mathematical calculation.

The amplitude interval set for each rise time section may or may not be symmetrical on either side of the amplitude spectrum maximum.

The width of the interval may or may not be constant. With the preferred use of the process however, an amplitude interval can be set which has a width as a function of the amplitude which corresponds to the maximum of the amplitude spectrum of each rise time section.

There could, in particular, be an amplitude interval with a width which diminishes as a function of the amplitude corresponding to the maximum of the amplitude spectrum for each rise time section. The width of the interval can also be decreased as a function of the rise time section in question.

Such a measure allows for reduction of the importance given to events which have a low amplitude and/or a low rise time. These events are more difficult to separate from those resulting from diffused radiation and thus present a less valuable contribution for image formation.

During the examination phase, it is possible to verify for each event whether the amplitude data is within the amplitude interval associated with the rise time section corresponding to the rise time data for the aforesaid event.

If the result of the verification is positive, the event is kept; otherwise, it is rejected.

This verification operation can be done rapidly and in real time so that there is almost no delay between the detection of an event and the formation of an image taking this event into account.

Based on a particular embodiment of the process, during step a), a table of pairs of amplitude and rise time ranges can be established, in which the pairs of amplitude and rise time ranges corresponding to the biparametric window are associated with logical event validation data in which the pairs of ranges outside the biparametric window are associated with logical event rejection data, and during step b), for each event there is a verification to see whether the amplitude and rise time data correspond to a pair of amplitude ranges associated with logical validation or rejection data, and the events corresponding to logical reject data are rejected.

By way of illustration, the logical value "1" can be associated with the amplitude-rise time pairs within the biparametric acceptance window and the logical value "0" can be associated with the amplitude-rise time pairs outside the biparametric window.

The invention also involves a process for uniformity correction for a radiation detector, i.e. a correction which tends to improve the uniformity of the detection efficiency of the various detection elements of the detector.

The correction process uses real time sorting as defined above and also includes, during the calibration phase:

counting of the number of events detected by each set of detection elements, each set being formed respectively of at least one detection element, and modification of the biparametric window so as to increase the sort selectivity for at least one set of detection elements showing greater detection efficiency and/or to decrease the aforesaid selectivity for at least one set of detection elements showing a lower detection efficiency.

Modification of the biparametric acceptance window can include adjusting at least one acceptance threshold for amplitude and/or rise time for the events.

The creation and adjustment of an amplitude and/or rise time acceptance threshold allows for taking into account, for each detection element or for each set of detection elements, of a greater or lesser number of events corresponding to signals which have a lower amplitude and/or lower rise time.

For the most efficient detectors for which the sort selectivity should be increased, the proposed process allows for priority elimination of events corresponding to weak amplitude or weak rise time signals, which provide a very uncertain information contribution for image formation.

As indicated previously, it is more difficult to distinguish these events from those due to diffused radiation.

Inversely, for the least efficient detectors, for which the sort selectivity should be reduced, the process allows for acceptance of a greater number of events.

Additional events, even if they correspond to signals which have a lower amplitude and/or rise time, provide better information than that obtained by simply multiplying the number of events by an arbitrary correction factor.

In other words, the process takes into account real additional events rather than fictitious events.

An additional correction using a correction factor is not ruled out. Such a correction would however apply to a reduced correction range.

The sort selectivity can be adjusted by comparing the number of events detected by a detection element or set of detection elements during a determined time, with a given number of reference events. Depending on the result of the comparison, the sort selectivity can be increased or decreased respectively depending on whether the number of events detected is greater than or less than the number of reference events.

The number of reference events may be for example the average number of events detected by all detection elements during the determined time. It can also be the lowest number of events detected by one of the detection elements.

The uniformity correction process can be applied individually for each detection element or for sets of detection elements including several detection elements.

The invention also involves a device for real time sorting of signals of detection events from several detection elements. The device includes:

means of measurement of the amplitude and rise time data for each signal, means for acquisition of data apt to record a biparametric spectrum of amplitude and rise time data during a calibration phase for at least one set of detection elements, means for determination for each set of detection elements of at least one correlation between the amplitude and rise time data, means for selection in the spectrum of a biparametric acceptance window corresponding to the aforesaid correction, memory to record for each set of detection elements at least one pair of rise time and amplitude data ranges corresponding to the biparametric acceptance window, and means for sorting events, these sorting means being apt to compare the amplitude and rise time data measured for the detection signals during an examination phase with memorised data range pairs for each set of detection elements, and to select the events for which the data correspond to the aforesaid memorised range pairs.

The device can in particular include an application specific integrated circuit board (ASIC) associated with a detection matrix including the detection elements. The integrated circuit board can then form the means of measurement of the amplitude and rise time.

More precisely, the matrix of detection elements can be associated with first ASIC-type integrated circuits to be used for amplification, formatting and multiplexing of the detector signals. The outputs from these first circuits are connected to second circuits to process the signals so as to establish for each signal four data which are the coordinates of positions X, Y of the event detected in a detection plane formed by the detection elements, and the amplitude and rise time data of the signal.

The coordinates of the X, Y position of the event can imply be given as a function of the position in the detection plane of the detection elements which delivered the corresponding signal.

The first and second circuits can be integrated on one or several boards. These boards are associated with a platform for reception of the detection elements.

The means of acquisition and determination of a correlation, the means of selection and the means of sorting can be in the form of a computer program for processing the signal data mentioned above. The means can also be made in the form of specific integrated circuits.

The device can also have means for adjusting the biparametric window to obtain uniform detection efficiency of selected events for each set of detectors. These means can also be in the form of software.

As previously explained, the adjustment of the biparametric window allows for modification of the sort selectivity and compensation of the disparities existing between the detection efficiencies of the various detection elements or various sets of detection elements.

Other characteristics and advantages of the present invention will be clearer with the description which follows, with reference to the figures of the appended drawings. This description is given solely for the purpose of illustration and is in no way limiting.

DETAILED DESCRIPTION OF EMBODIMENTS OF THE INVENTION

Figure 3:
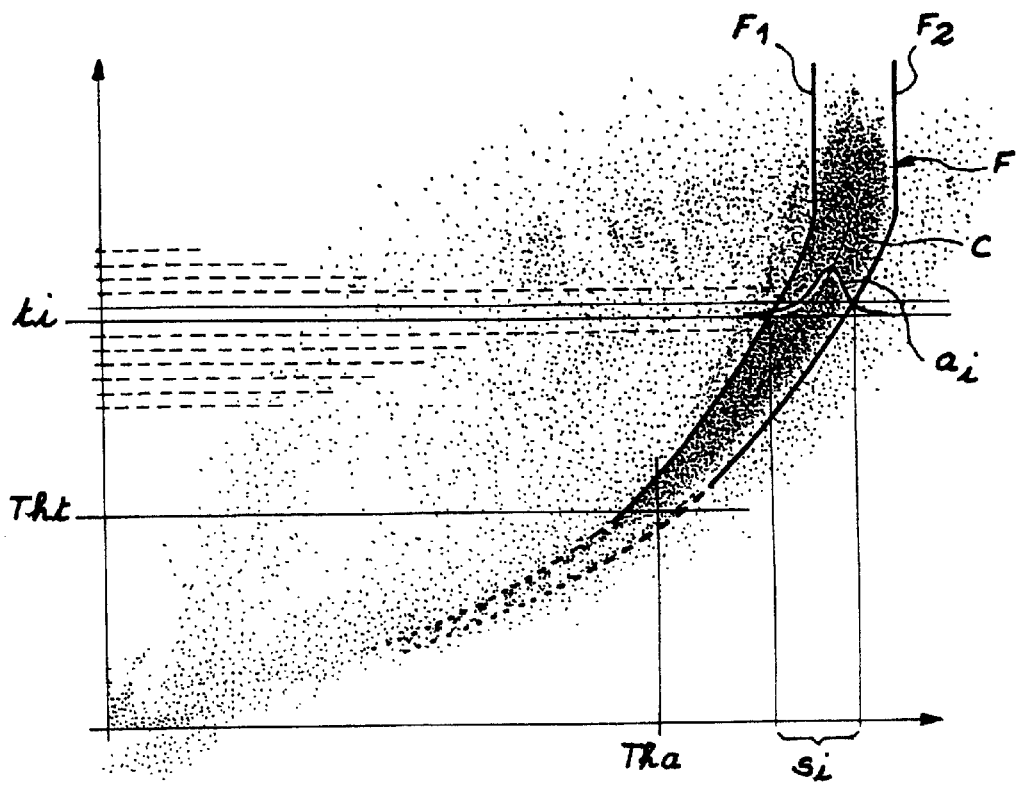
FIG. 3 is a graph illustrating an acquisition spectrum used in the invention process to determine a biparametric window.

FIG. 3 shows an event acquisition spectrum for a detection element of a semi-conductor detector. The events can be characterised by rise time data and amplitude data of the detection signal. Since they come from the same detection elements however, all of the events of this spectrum have the same position data. The description which follows is however still applicable to a set including several detection elements and thus to events with different position data.

For the purpose of simplification, the spectrum shown is that obtained with a single energy source.

The spectrum in FIG. 3 is acquired during the first phase of the process, i.e. the calibration phase. The acquisition is continued until a sufficient number of events is obtained for statistic-type processing. For example, the spectrum in FIG. 3 could represent 100,000 events.

FIG. 3 indicates the events as a function of the amplitude of the corresponding signal, indicated on the abscissa, and the rise time of the signal, indicated on the ordinate. The scales of the amplitude axes and the rise time are free.

The scale of the rise times is cut into sections, each with a given width. In the figure, only one section with reference $t_i$ is indicated.

Each event detected during the calibration phase is represented by a point on the figure. It is assigned to a given rise time section as a function of the rise time of the signal produced by the detection element in response to this event.

An amplitude spectrum is established with all of the events assigned to a given rise time section. The amplitude spectrum can also be established by cutting the scale of amplitudes into sections and counting the number of events in each amplitude section. The amplitude spectrum can be smoothed.

As an illustration, a part of the smoothing curve of the amplitude spectrum is schematically indicated on the figure for the rise time section $t_i$. The smoothing curve of the amplitude spectrum bears the reference $a_i$.

The maximum of the amplitude spectrum or smoothing curve is then sought for each rise time section.

The maxima of the amplitude spectra corresponding to the various rise time sections are essentially located along a curve indicated with reference C.

This curve is representative of a correlation existing between the rise time and the amplitude of the events resulting from the detection of direct radiation. This curve is referred to as the "correlation curve" in the remainder of the text.

In the example in the figure, there is only one correlation curve C due to the single energy source used.

When the source includes several different energy emission lines however, a corresponding number of correlation curves can be distinguished in the spectrum.

In this case, it is also necessary to verify for each amplitude spectrum that the determined maximum is in fact on a "physical" curve. In other words, this means determining the maxima on the correlation curves which do not show slope discontinuity.

A next step involves determining for each rise time section an amplitude interval on both sides of an amplitude spectrum maximum. By way of illustration, the interval associated with the rise time section $t_i$ on FIG. 3 is indicated with the reference $s_i$.

The extension of the interval on either side of the correlation curve can be adjusted to obtain a lesser or greater event sort selectivity, i.e. to more or less selectively reject the events linked to diffused radiation.

In the example shown, the width of the amplitude interval is chosen greater for high amplitudes and rise times and lesser for low amplitudes and rise times. It can also be adjusted overall as a function of the resolution of the detection element.

The set of amplitude intervals around the correlation curve established for all of the rise time sections constitutes, in the example described, the biparametric acceptance window F.

In the example in the figure, the window F is bounded by two curves $F_1$ and $F_2$ which are formed respectively from the minimal and maximal limit values of the intervals chosen for each rise time section.

As indicated previously, the various detection elements of a detector do not all have the same detection efficiency.

By adjusting the size of the biparametric window F, it is possible to modify the sort selectivity and to thus correct the flaws in uniformity.

The size of the window is preferably modified by adjusting the window for events corresponding to the lowest rise time or amplitude values.

The adjustment in the example described is done by establishing an amplitude and/or rise time threshold of which the value can be modified. In the figure, the amplitude and rise time thresholds are respectively indicated with the references Tha and Tht.

Figure 4:
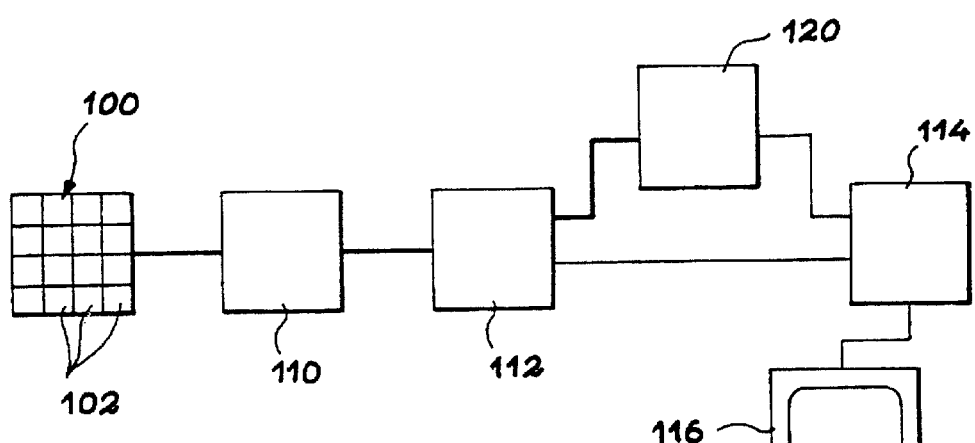
FIG. 4 is a simplified scheme of a sorting device according to the invention.

The diagram of the device in FIG. 4 will now be examined in order to better understand the second phase of the process.

Figure 1:
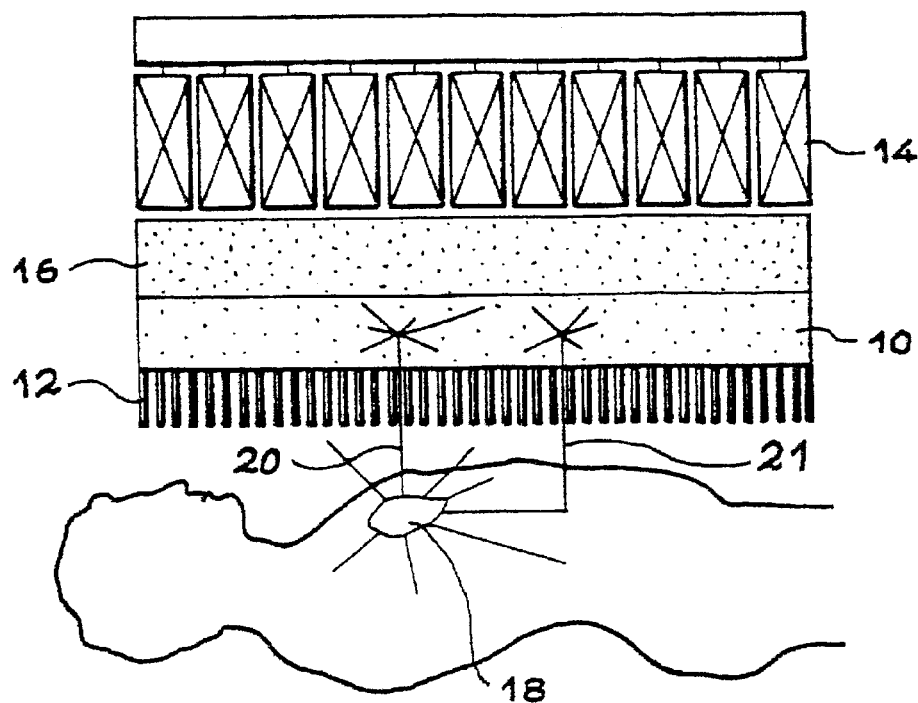
FIG. 1, already described, is a simplified schematic representation of a section of a Anger type gamma-camera detector, FIG. 2, already described, is a partial and schematic cut-away diagram of a semiconductor detector.
Figure 2:
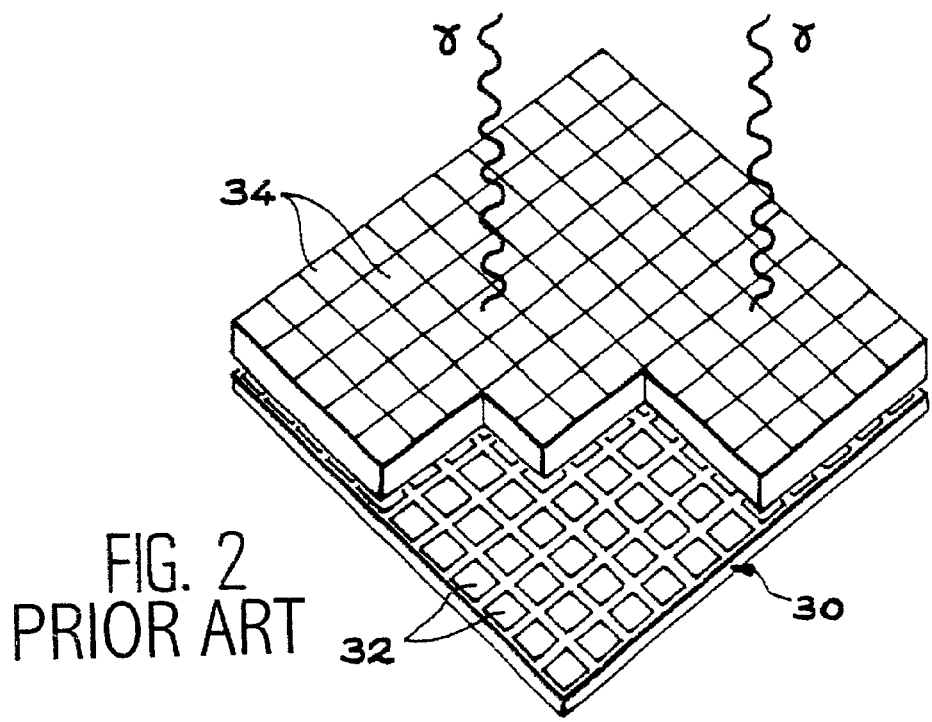

Reference 100 on FIG. 4 designates a matrix of semiconductor detection elements 102 arranged in a detection plane. This matrix is comparable to that described in reference to FIG. 2.

The signals delivered by the detection elements are directed to a first specific integrated circuit (ASIC) 110. This circuit includes signal amplification channels for each detection element and means for multiplexing the channels.

A second circuit 112 determines the amplitude and rise time of each signal and formats the corresponding data to these values, as well as the data representing the event coordinates. The event coordinates are linked to the position of the corresponding detection element in the detection plane.

The data are sent to a computer 114 which does calculations and processing linked to the calibration phase and used to construct a (medical) image from data during the examination phase. The image is displayed on a screen 116.

During the calibration phase, the computer is designed to build from the data, for each detection element, an acceptance table including the logical values "1" and "0". The logical value "1" is assigned to amplitude-rise time pairs within the correlation window and the logical value "0" is assigned to amplitude-rise time pairs outside the window. More precisely, the logical values can be assigned to amplitude-rise time range pairs.

As a variation, the tables can also be built from the boundaries of the biparametric window, i.e. by referring to FIG. 3, from curves $F_1$, $F_2$ which determine the window and the threshold values Tha, Tht.

The acceptance tables are stored in a memory indicated with the reference 120 on FIG. 4.

During the examination phase, the circuits 110 and 112 always establish the amplitude and rise time data and the coordinates of the events from detection element signals.

The data are used to check in real time the acceptance table of the corresponding detection element and to read the logical value associated with the amplitude-rise time pair.

If this value is "1", the event is retained for formation of an image and if this value is "0", the event is ignored.

The acceptance tables are consulted in real time by direct addressing of the table in question in the memory 120 via the data contained in the output signal 112.

Thresholds Tha and Tht can also be modified by the computer 114 according to the process previously described in order to make the detection efficiency of the various detection elements more uniform.

What is claimed is:

1. A process for sorting a plurality of event signals from a gamma ray detector including at least one semiconductor detection element, comprising a calibration phase and an examination phase, said calibration phase further comprising:
   establishing amplitude data and signal rise time data for each said event signal;
   acquiring a biparametric detection spectrum with amplitude and rise time for at least one set including at least one detection element; and
   establishing a biparametric acceptance window corresponding respectively to an amplitude-rise time correlation characteristic of at least one radiation energy for each spectrum;

said examination phase further comprising:
   establishing an amplitude, rise time data pair in real time for each event signal detected from each set of detection elements;
   sorting the events in real time;
   selecting the signals according to whether their amplitude and rise time data are or are not within the biparametric window of the corresponding set of detection elements; and
   rejecting the signals of which the amplitude and rise time data are outside said biparametric window.

2. A process according to claim 1, and further comprising, during the calibration phase:
   defining a continuous set of rise time sections;
   assigning each event to a rise time section as a function of its rise time data;
   establishing for each rise time section, an amplitude spectrum with the amplitude data of the events for which the rise time is included in said rise time section;
   determining an amplitude spectrum maximum for each rise time section; and setting an amplitude interval on both sides of said maximum for each rise time section.

3. A process according to claim 2, and further comprising smoothing said spectrum before determining the amplitude spectrum maximum of each spectrum.

4. A process according to claim 2, wherein the amplitude interval is symmetrical on either side of said maximum for each rise time section.

5. A process according to claim 2, wherein the amplitude interval has a width as a function of the amplitude corresponding to the amplitude spectrum maximum of each rise time section.

6. A process according to claim 2, wherein during the examination phase, the step of verifying for each event that the amplitude data is within the amplitude interval associated with the rise time section corresponding to its rise time data.

7. A process according to claim 1, wherein:
during the calibration phase, a table of pairs of amplitude and rise time ranges is established and recorded, in which the pairs of amplitude and rise time ranges corresponding to the biparametric window are associated with logical event validation data in which the pairs of ranges outside the biparametric window are associated with logical event rejection data; and
during the examination phase, the step of verifying, for each event, whether the amplitude and rise time data correspond to a memorized pair of amplitude and rise time ranges associated with logical validation or rejection data, and the events corresponding to logical reject data are rejected.

8. A process according to claim 1, wherein each set of detection elements includes a single detection element.

9. A process according to claim 1, and including the step of sorting, in real time, event signals, and also including, during the calibration phase, the steps of:
counting of the number of events detected by each set of detection elements; and
modifying the biparametric window so as to increase the sort selectivity for at least one set of detection elements with a higher detection efficiency and/or to decrease said selectivity for at least one set of detection elements with lower detection efficiency.

10. A process according to claim 9, wherein modification of the biparametric acceptance window includes adjustment of at least one threshold for event acceptance in terms of amplitude and/or rise time.

11. A process according to claim 9, including the step of comparing the number of events detected per set of detection elements for a given time with a number of reference events and increasing or decreasing sort selectively if the number of events detected is respectively greater or lower than the number of reference events.

12. A process according to claim 11, wherein the number of reference events is an average number of events detected by the set of detection elements within a determined time.

13. A process according to claim 11, wherein the reference number of events is the lowest number of events detected by one of the detection elements.

14. A process according to claim 9, wherein each set of detection elements includes a single detection element.

15. A device for real time sorting of detection event signals from several semiconductor detection elements comprising:
means for measuring amplitude data and rise time data for each signal;
means for acquiring data adapted for recording during a calibration phase of a biparametric spectrum of amplitude and rise time data for at least one set of detection elements;
means for determination of at least one correlation between the amplitude and rise time data for each set of detection elements;
means for selection in the spectrum of a biparametric acceptance window corresponding to said correlation;
a memory for memorizing for each set of detection elements at least one pair of rise time and amplitude data ranges corresponding to the biparametric acceptance window; and
means for sorting of events, the means of sorting being adapted to compare for each set of detection elements, the amplitude and rise time data measured for each detection signal during an examination phase with the pairs of data ranges memorized, and to select events for which the data correspond to said pairs of memorized ranges.

16. A device according to claim 15, including at least one application specific integrated circuit board associated with a detection matrix including the detection elements, and forming the means of measurement of amplitude and rise time.

17. A device according to claim 15, wherein the device includes a computer including, in the form of a program, the means for acquisition, determination of a correlation, selection and sorting.

18. A device according to claim 15, and including means for adjusting the parametric window to obtain uniform detection efficiency of selected events for each set of detectors.

19. A device according to claim 15, wherein each set of detection elements includes a single detection element.

20. A device according to claim 15, in combination with a gamma-camera.

* * * * *